United States Patent
Allen

[15] 3,673,622
[45] July 4, 1972

[54] AMPHIBIAN CAMPER VEHICLE

[72] Inventor: Randy B. Allen, 2179 India Hook Road, Rock Hill, S.C. 29730

[22] Filed: Dec. 4, 1970

[21] Appl. No.: 95,191

[52] U.S. Cl. ........................... 9/1 T, 115/1 R, 280/414 R
[51] Int. Cl. ............................................. B63b 35/00
[58] Field of Search .................. 9/1 T, 1 R; 114/56, 61, 63, 114/66.5 F; 115/1 R, 1 A; 280/414 R, 414 A, 414 B; 296/23 MC, 23 B

[56] References Cited

UNITED STATES PATENTS

| | | | |
|---|---|---|---|
| 2,992,444 | 7/1961 | Schuler | 9/1 T |
| 3,091,208 | 5/1963 | Copeland et al. | 115/1 R |
| 3,134,991 | 6/1964 | Levinson | 9/1 T |
| 3,308,782 | 3/1967 | Dahl | 115/1 R |
| 3,414,916 | 12/1968 | Martin et al. | 9/1 T |
| 3,434,166 | 3/1969 | Clymer | 9/1 R |
| 3,436,774 | 4/1969 | Schmitz | 9/1 T |

*Primary Examiner*—Milton Buchler
*Assistant Examiner*—F. K. Yee
*Attorney*—B. P. Fishburne, Jr.

[57] ABSTRACT

A camper vehicle body travels over land on a wheeled trailer bed behind any towing vehicle having suitable hitch means. To sustain the camper body in the water, the same is equipped with laterally extendable outrigger floats or pontoons. The pontoons are nestable within side notches of the camper body during over land travel so that the caravan will not exceed highway width regulations.

6 Claims, 7 Drawing Figures

INVENTOR
RANDY B. ALLEN

ATTORNEY

INVENTOR
RANDY B. ALLEN

BY B.P. Fishburn, Jr.

ATTORNEY

INVENTOR
RANDY B. ALLEN
BY B.P. Fishburn Jr
ATTORNEY

AMPHIBIAN CAMPER VEHICLE

Many forms of amphibian vehicles are known in the prior art including basic self-contained and self-powered land vehicles which possess pontoon attachments of various sorts shiftable to active positions when the vehicle enters the water and stored in various ways while the vehicle is on land. Other amphibian devices are essentially boats with integral wheeled running gear to allow them to emerge from the water and run on land. Additionally, trailers for boats are well known to enable the transporting over land of cabin cruisers and the like.

Generally, amphibians which are self-powered on land and carry their land running gear at all times suffer from the exposure of the land running gear including brakes to water particularly corrosive salt water. The brakes including electric brakes are very adversely effected in the water and complex and costly sealing means are required if the vehicles are to be practical. Ordinary boats and boat trailers do not satisfy the needs which the present invention was conceived to satisfy because boats, such as cabin cruisers and the like, are not constructed to serve conveniently for land travel including camping.

There have been some attempts in the prior art to render camper bodies floatable or to equip them with pontoon attachments so as to produce a houseboat. However, most of these prior art efforts have resulted in very cumbersome and costly arrangements and arrangements which make it very difficult to convert the vehicle from water to ground usage or vice-versa. For example, large pontoons are sometimes carried overhead while the device is on land or are carried at the sides of the vehicle body. In either case, highway safety dimensional limitations for vehicles are usually exceeded.

With the above recognized problems concerning amphibians in mind, it is the principal object of the invention to provide a wholly practical and simplified amphibian camper which may be towed over land by an automobile and used on land much like any camper trailer. Additionally, the camper body has its own base frame which allows it to move easily onto and off of the bed of the trailer as when launching in the water or being retrieved therefrom. In the water, the camper body utilizes unique outrigger floats or pontoons for maximum stability and these are retracted compactly into longitudinal side notches of the body when not in use.

Other features and advantages of the invention will be apparent during the course of the following description.

BRIEF DESCRIPTION OF DRAWING FIGURES

DETAILED DESCRIPTION

Figure 1:
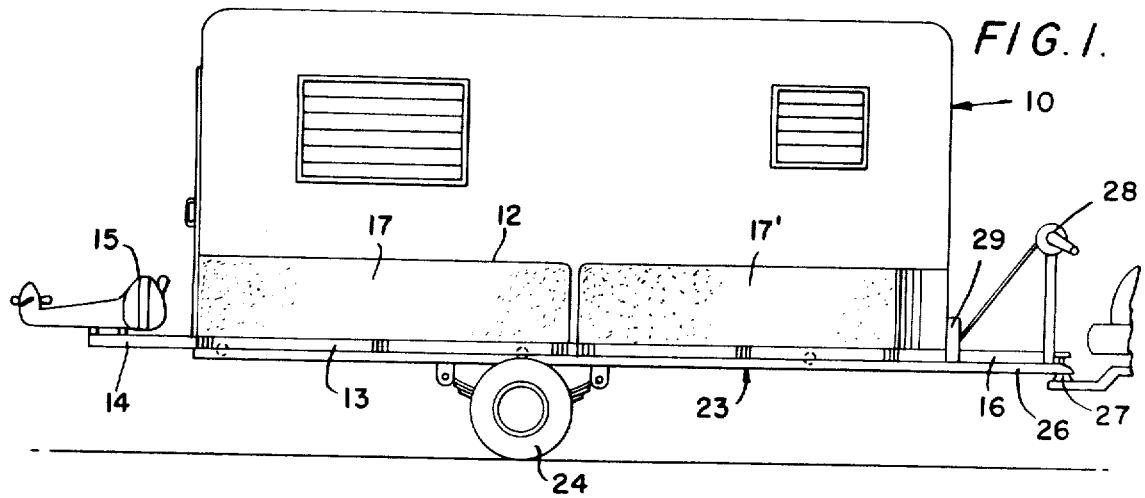
FIG. 1 is a side elevational view of an amphibian camper vehicle embodying the invention and showing the same on land.

Referring to the drawings in detail, wherein like numerals designate like parts throughout, the numeral 10 designates a camper trailer body of the general type sometimes mounted on pick-up trucks for over land usage. While the interior and exterior details of the body 10 are relatively unimportant, it is pointed out that the camper body has a rear exit door 11 and is provided on opposite sides and in its bottom with a pair of longitudinal rectangular notches or cut-outs 12 which are utilized to advantage in the present invention as storage spaces for extensible and retractable floats, yet to be described. This notched construction of the camper body is conventional on certain truck-mounted camper bodies.

The camper body 10 is suitably integrated with a rigid flat base frame or bed 13 of sturdy construction which closely underlies the floor of the body 10 and extends for its full width including the width of the notches 12. The bed 13 includes a rear walkway extension 14 integral therewith upon which is mounted a suitable outboard motor 15. At its forward end, the bed or frame 13 has an integral forwardly tapering V-shaped guide extension 16 projecting well forwardly of the body 10 for an important purpose to be described.

Figure 4:
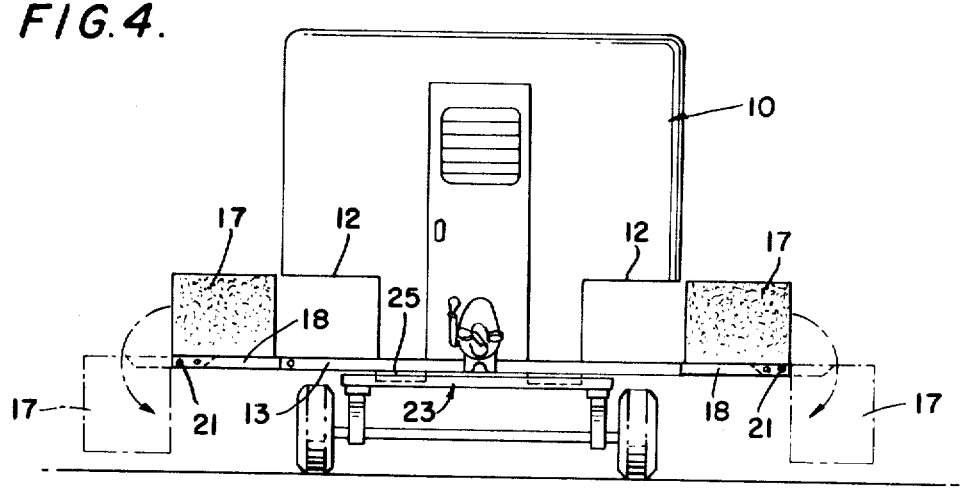
FIG. 4 is another rear elevation illustrating the extension and positioning of outrigger floats preparatory to using the device on water.

Mounted adjustably on opposite sides of the bed 13 of the camper body are floats or pontoons preferably in two sections 17 and 17'. These pontoon sections on each side of the vehicle are supported on spaced transverse arms or bars 18 which telescope slidably into sleeves 19, FIG. 6, forming integral parts of the bed or frame 13. The pontoon sections 17 and 17' have anchor bars 20 embedded therein hingedly secured at 21 to the extensible and retractable arms 18. Thus, the pontoon sections may pivot about the elements 21 as shown in FIG. 4 when moving to and from water-use positions. When the floats or pontoons are in the down positions in the water, FIG. 5, they are locked rigidly to the arms 18 by removable bolt elements 22 or some like simple locking means.

When the pontoon sections are to be retracted into the notches 12 for storage therein while moving over land, the locking bolts 22 are first removed and the sections 17 and 17' are pivoted upwardly to lie on top of the arms 18 and these arms are then shifted inwardly of the sleeves 19 telescopically to position the float sections bodily in the notches 12.

Figure 5:
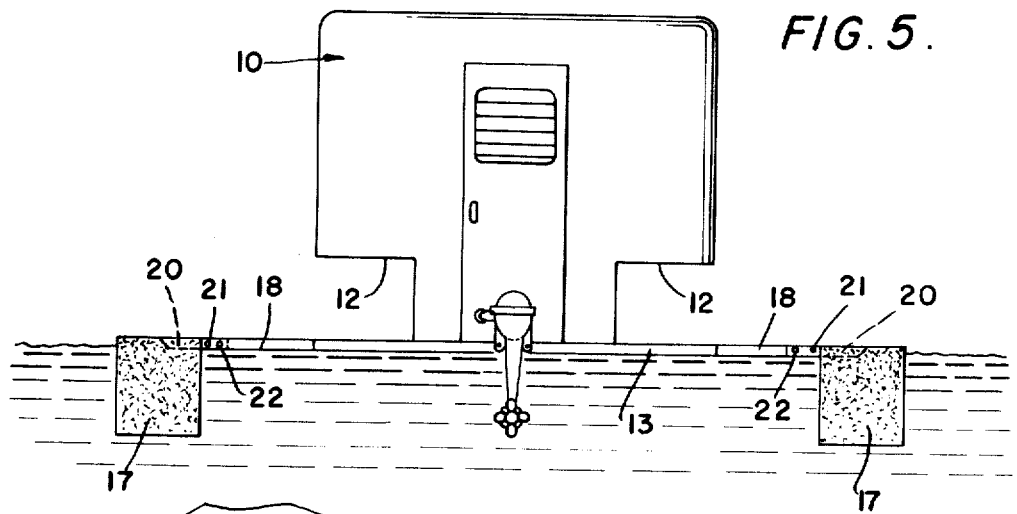
FIG. 5 is a similar view showing the vehicle launched in the water.
Figure 6:
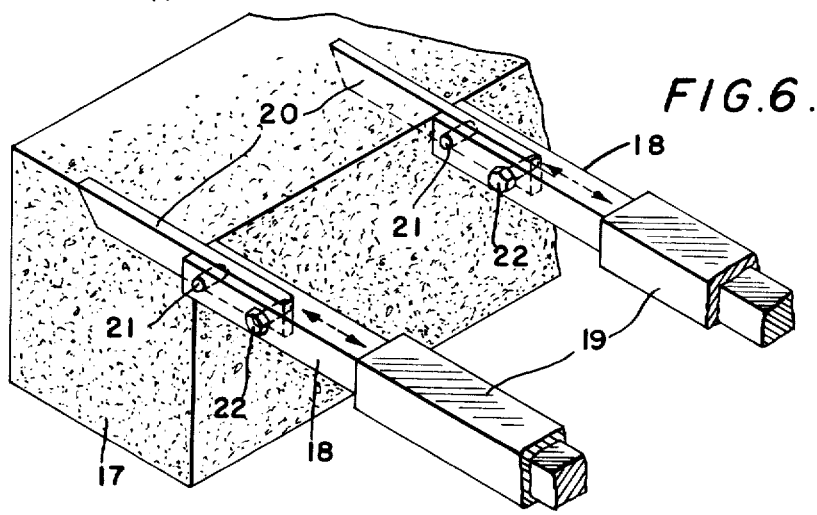
FIG. 6 is an enlarged fragmentary perspective view of float supporting and locking means.

When the arms 18 are fully extended for water usage, FIG. 5, the floats or pontoons lie substantially beyond the opposite sides of the body 10 for stability in the water. When they are retracted into the notches 12, the pontoons are above the bed 13 and do not add anything to the width of this bed or the body 10 mounted thereon.

Figure 7:
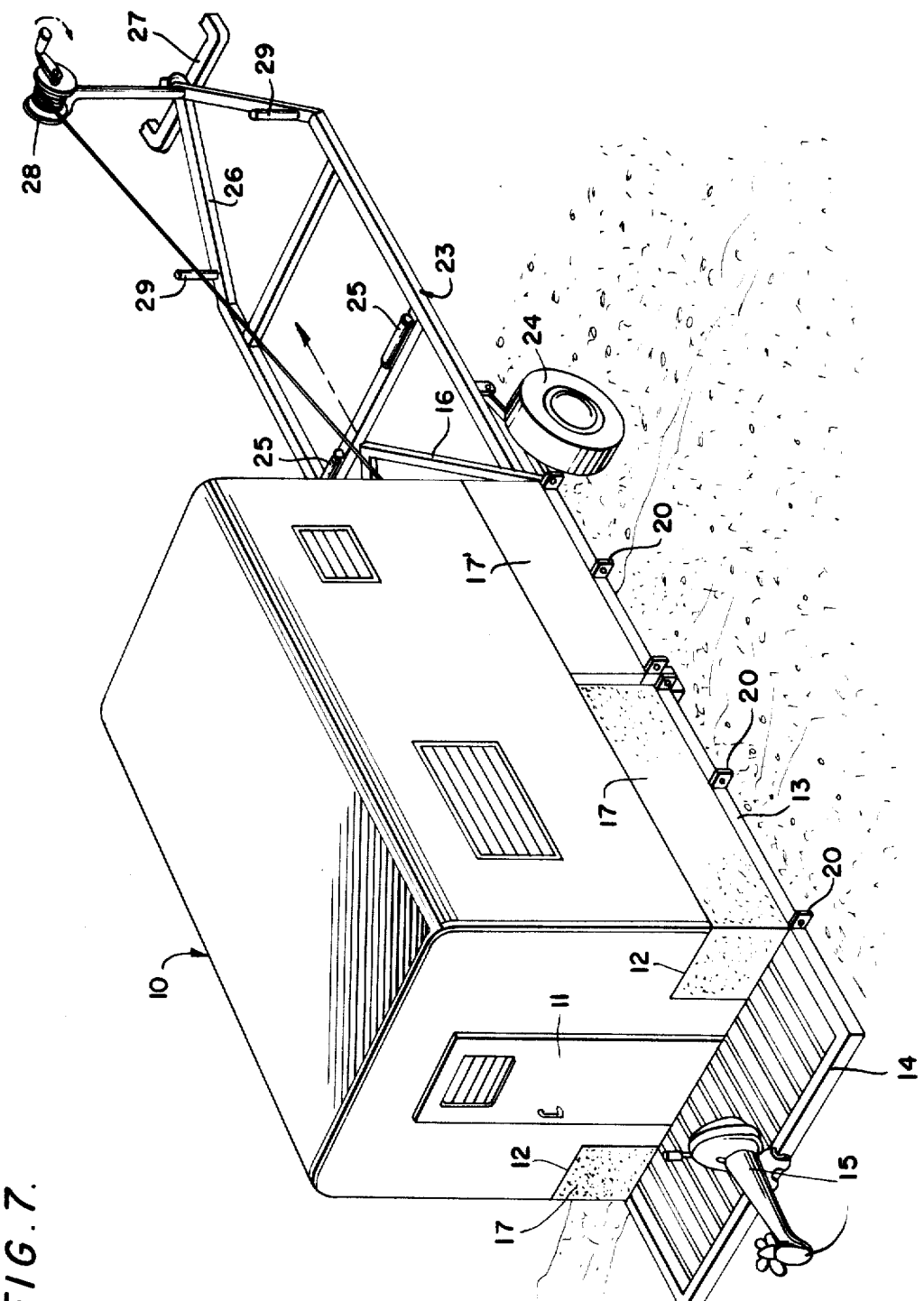
FIG. 7 is a perspective view showing the retrieval of the vehicle from the water preparatory to land travel.

The vehicle further comprises a sturdy trailer bed 23 somewhat narrower than the bed 13 and adapted to underlie the latter and support the bed 13 and camper body 10 during over land travel. The trailer bed 23 is mounted on wheels 24 in a generally conventional manner and these wheels are equipped with conventional brakes, such as electric brakes, operated remotely from the towing vehicle. The trailer bed 23 is also equipped at spaced intervals with low friction rollers 25 which allow the easy passage of the bed 13 onto and off of the wheeled trailer bed. The trailer bed 23 has a forward tongue extension 26 adapted to be coupled with an automotive towing hitch 27 of any well known type. The trailer bed may be equipped with a manual or power winch 28 for use in pulling the bed 13 and body 10 onto the trailer as when retrieving the floating portion of the device from the water, as illustrated in FIG. 7.

Figure 2:
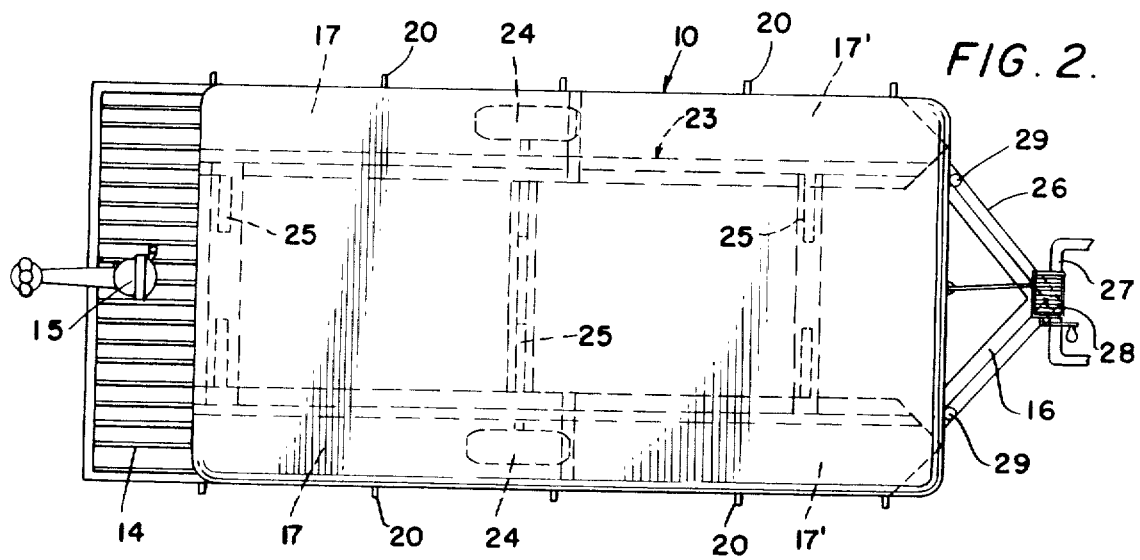
FIG. 2 is a plan view thereof.
Figure 3:
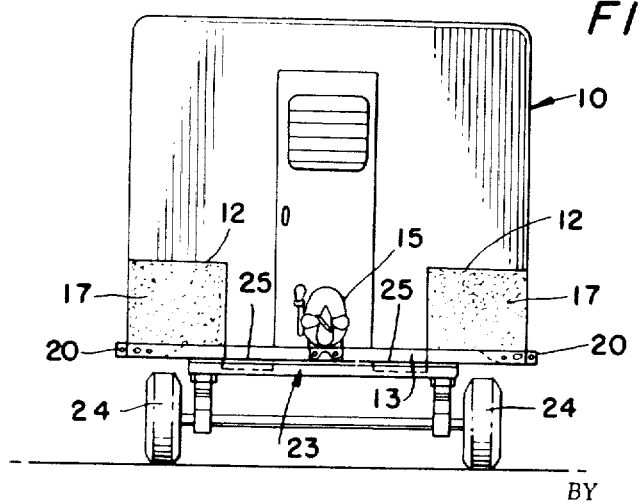
FIG. 3 is a rear elevation of the vehicle.

Near the rear of the tongue 26, the trailer bed 23 has a pair of laterally spaced upstanding rigid posts 29 which engage the V-shaped extension 16 of the bed 13 and guide the same laterally into the proper position on the trailer bed, as shown in FIG. 2. In such position, the trailer bed 23 will be properly centered beneath the frame or bed 13 of the camper body and the assemblage will be stable and balanced for travel on the highway. Additional conventional means, not shown, may be employed to releasably lock the bed 13 onto the trailer bed during highway travel.

When launching the floatable portion of the vehicle from the trailer bed 23, the latter is backed up to the edge of the water, much like a boat trailer, and after adjusting the floats or pontoons as shown in FIGS. 4 and 5, the body 10 and its bed 13 are allowed to slide into the water in a controlled manner until full floating is achieved, after which the trailer bed 23 can be removed.

It is to be understood that the form of the invention herewith shown and described is to be taken as a preferred example of the same, and that various changes in the shape, size and arrangement of parts may be resorted to, without departing from the spirit of the invention or scope of the subjoined claims.

What is claimed is:

1. An amphibian camper vehicle comprising a wheeled land trailer bed, a camper body, a separate bed for the camper body rigid therewith and adapted to be moved onto or off of the trailer bed for land travel or water travel, the camper body having notches formed longitudinally in its opposite sides and bottom, extensible and retractable arm means on the bed of the camper body, and pontoons hingedly carried by said arm means and swingable thereon to use positions below the arm means and notches and to storage positions above the arm means where they can be drawn into the notches for storage therein.

2. The structure of claim 1, and releasable means to lock the pontoons down in their use positions below the arm means.

3. The structure of claim 2, and the arm means comprising plural spaced parallel transverse arms on the bed of the camper body engaging telescopically within a corresponding number of fixed sleeves forming parts of the camper body bed.

4. The structure of claim 1, and a forward tapering extension on the bed of the camper body, and a pair of laterally spaced upstanding guide abutments on the forward portion of the trailer bed engageable with the tapered extension for guiding the camper body and its bed onto the trailer bed.

5. The structure of claim 4, and the trailer bed having rollers thereon to engage beneath the camper body bed when the latter is being moved onto or off of the trailer bed.

6. The structure of claim 1, and said arm means including plural telescoping transverse arms on opposite sides of the bed of the camper body, a corresponding number of anchor bars secured at spaced intervals to the pontoons rigidly, and pins pivotally connecting the anchor bars to said arms.

* * * * *